United States Patent
Riddiford (10) Patent No.: US 10,703,159 B2
(45) Date of Patent: Jul. 7, 2020

(54) VEHICLE SUSPENSION CONTROL SYSTEM AND METHOD OF OPERATION THEREOF

(71) Applicant: BEIJINGWEST INDUSTRIES CO., LTD., Beijing (CN)

(72) Inventor: Bryan Peter Riddiford, Dayton, OH (US)

(73) Assignee: BEIJINGWEST INDUSTRIES CO., LTD., Beijing (CN)

(*) Notice: Subject to any disclaimer, the term of this patent is extended or adjusted under 35 U.S.C. 154(b) by 176 days.

(21) Appl. No.: 15/947,704

(22) Filed: Apr. 6, 2018

(65) Prior Publication Data
US 2018/0319236 A1    Nov. 8, 2018

Related U.S. Application Data

(60) Provisional application No. 62/521,965, filed on Jun. 19, 2017, provisional application No. 62/501,261, filed on May 4, 2017.

(51) Int. Cl.
*B60G 17/015* (2006.01)
*B60G 17/016* (2006.01)
(Continued)

(52) U.S. Cl.
CPC ....... *B60G 17/0155* (2013.01); *B60G 17/016* (2013.01); *B60G 17/0424* (2013.01);
(Continued)

(58) Field of Classification Search
CPC ............ B60G 17/0155; B60G 17/0523; B60G 17/0424; B60G 17/016; B60G 2800/914;
(Continued)

(56) References Cited

U.S. PATENT DOCUMENTS 4,736,965 A * 4/1988 Smith .................. B60G 17/056
                                                                280/124.129
4,787,644 A   11/1988 Yokote
(Continued)

FOREIGN PATENT DOCUMENTS

CN     1302262 A    7/2001
CN   101856961 A   10/2010
(Continued)

OTHER PUBLICATIONS

First Office Action and search report dated Oct. 21, 2019 for counterpart Chinese patent application No. 201810324115.4, along with machine EN translation downloaded from EPO.
(Continued)

*Primary Examiner* — Darlene P Condra
(74) *Attorney, Agent, or Firm* — William H. Honaker; Dickinson Wright PLLC (57) ABSTRACT

An air management system and method are provided. The system includes a pressurized air source. A manifold block is coupled to the pressurized air source and includes a plurality of suspension valves in fluid communication with the pressurized air source for controlling air flow to and from a plurality of air springs. An accumulator is coupled to the manifold block for storing air. An accumulator valve is in fluid communication with the plurality of suspension valves and the accumulator to allow exhausted air from the plurality of air springs into the accumulator. An electronic control unit is electrically coupled to the plurality of suspension valves and the accumulator valve for controlling a sequence of operating the accumulator valve and the plurality of suspension valves to provide enhanced exhaust flow from the plurality of air springs to maintain the vehicle in a level orientation while lowering the vehicle.

20 Claims, 7 Drawing Sheets

(51) Int. Cl.
*B60G 17/04* (2006.01)
*B60G 17/052* (2006.01)

(52) U.S. Cl.
CPC ...... *B60G 17/0523* (2013.01); *B60G 17/0525* (2013.01); *B60G 2400/51222* (2013.01); *B60G 2500/202* (2013.01); *B60G 2500/203* (2013.01); *B60G 2500/2041* (2013.01); *B60G 2600/66* (2013.01); *B60G 2800/019* (2013.01); *B60G 2800/912* (2013.01); *B60G 2800/914* (2013.01)

(58) Field of Classification Search
CPC ........ B60G 2500/203; B60G 2500/202; B60G 2800/019; B60G 17/0525; B60G 2600/66; B60G 2500/2041; B60G 2800/912; B60G 2400/51222; B60G 2202/152; B60G 2500/30; B60G 17/052; B60G 17/015
See application file for complete search history.

(56) References Cited

U.S. PATENT DOCUMENTS

| | | | | |
|---|---|---|---|---|
| 4,836,575 A * | 6/1989 | Buma | .................. | B60G 17/033 280/124.157 |
| 5,228,704 A * | 7/1993 | Tabe | .................... | B60G 17/017 280/6.159 |
| 5,251,134 A * | 10/1993 | Takehara | ........... | B60G 17/0162 280/124.106 |
| 2003/0125858 A1* | 7/2003 | Lin | ...................... | B60G 17/005 701/50 |
| 2006/0017250 A1* | 1/2006 | Kim | .................... | B60G 17/0155 280/124.16 |
| 2009/0105905 A1* | 4/2009 | Hoffman | ............ | B60G 17/0155 701/36 |
| 2012/0097282 A1* | 4/2012 | Coombs | .............. | F15B 13/0814 137/861 |
| 2012/0241236 A1 | 9/2012 | Leclerc | | |
| 2013/0255240 A1* | 10/2013 | Bergemann | ........ | B60G 17/0523 60/327 |
| 2014/0172233 A1 | 6/2014 | Hiebert | | |
| 2014/0333038 A1* | 11/2014 | Gocz | .................. | B60G 17/0523 280/6.157 |
| 2015/0345490 A1* | 12/2015 | Bremeier | ................ | F04B 49/06 417/22 |

FOREIGN PATENT DOCUMENTS

| | | |
|---|---|---|
| EP | 2902225 | 8/2015 |
| GB | 2159107 | 11/1985 |
| WO | 2005005181 | 1/2005 |

OTHER PUBLICATIONS

Extended European Search Report dated Feb. 25, 2019 for counterpart European patent application No. EP18168753.4.

* cited by examiner

VEHICLE SUSPENSION CONTROL SYSTEM AND METHOD OF OPERATION THEREOF

CROSS-REFERENCE TO RELATED APPLICATIONS

This utility application claims the benefit of U.S. Provisional Application No. 62/501,261 filed May 4, 2017 and U.S. Provisional Application No. 62/521,965 filed Jun. 19, 2017. The entire disclosures of the above applications are incorporated herein by reference.

FIELD

An air management system for controlling an air suspension assembly of an automotive vehicle. More specifically, an air suspension control system for maintaining the vehicle in a level orientation when lowering or raising the vehicle and a method of operating the air management system to control the air suspension assembly accordingly.

BACKGROUND

Air suspension assemblies are known in the art for use on automotive vehicles. Such air suspension assemblies typically include a plurality of air springs, each for interconnecting the body and one of the wheels of the automotive vehicle for damping relative forces between the body and the wheels, and for adjusting the height of the automotive vehicle.

In order to control such air suspension assemblies, air management systems are commonly utilized. The air springs are commonly connected via one or more air lines to a manifold block of the air management system. The air management system may also include a compressor and/or pump including a motor coupled to the manifold to provide pressurized air to fill the air springs. Because moisture can be an issue in air suspension systems, air management systems may also include a dryer. While high flow rates may be desirable during inflation or exhausting of the air springs, high flow rates can, nevertheless, adversely affect the operation of the dryer and/or allow excessive levels of moisture to reside in the air management system.

Additionally, when raising or lowering the vehicle, it is desirable to maintain a constant vehicle "horizon," also referred to as concurrent leveling or one motion leveling. In other words, it is important that the air springs in the front of the vehicle are inflated and/or exhausted in a consistent manner as compared to the air springs in the rear of the vehicle, so that the vehicle stays generally level front to rear as it is raised or lowered. Pressure levels in the air springs in the front of the vehicle and the rear of the vehicle can vary depending on the weight distribution of the vehicle and loading of the vehicle at any given time. Such differences in the pressure levels can further complicate the ability of the air management system to maintain the vehicle "horizon." Thus, there remains a need for improvements to air management systems and methods of operating the air management system to provide for a level vehicle orientation front to rear as the vehicle is raised or lowered while maintaining dryer operation and proper moisture levels within the air suspension and air management system.

SUMMARY

An air management system for controlling an air suspension assembly of an automotive vehicle is provided. The air management system includes a pressurized air source. The air management system also includes a manifold block coupled to the pressurized air source and including a plurality of front suspension valves and a plurality of rear suspension valves in fluid communication with the pressurized air source for controlling air flow to and from a plurality of front air springs and a plurality of rear air springs. At least one leveling assist subassembly is in fluid communication with the plurality of suspension valves to allow air flow to and from the plurality of front air springs and the plurality of rear air springs. An electronic control unit is electrically coupled to the plurality of front suspension valves and the plurality rear suspension valves and the at least one leveling assist subassembly for controlling a sequence of operating the at least one leveling assist subassembly and the plurality of front suspension valves and the plurality of rear suspension valves to enhance the air flow from the plurality of front air springs and the plurality of rear air springs to maintain the vehicle in a level orientation while at least one of lowering and raising the vehicle.

A method of operating an air management system during one of lowering and raising a vehicle is provided. The method includes the step of operating a plurality of front suspension valves coupled to a plurality of front air springs and a plurality of rear suspension valves coupled to a plurality of rear air springs to initiate one of lowering and raising the vehicle. The method proceeds with operating at least one leveling assist subassembly coupled to the plurality of front suspension valves and the plurality of rear suspension valves. The method also includes the step of providing enhanced air flow to and from at least one the plurality of front air springs and the plurality of rear air springs using the at least one leveling assist subassembly. The method concludes with the step of maintaining the vehicle in a level orientation while at least one of lowering and raising the vehicle.

The invention in its broadest aspect therefore affords an air management system that provides a constant vehicle "horizon" (i.e., level vehicle) while maintaining proper levels of moisture in the air management system and air suspension system.

DRAWINGS

Advantages of the present invention will be readily appreciated, as the same becomes better understood by reference to the following detailed description when considered in connection with the accompanying drawings wherein.

DETAILED DESCRIPTION

Referring to the Figures, example embodiments of an air management system 20, 120, 220 are generally shown for controlling an air suspension assembly of an automotive vehicle having a body and four wheels. Additionally, methods of operating the air management systems 20, 120, 220 are also disclosed.

Figure 1:
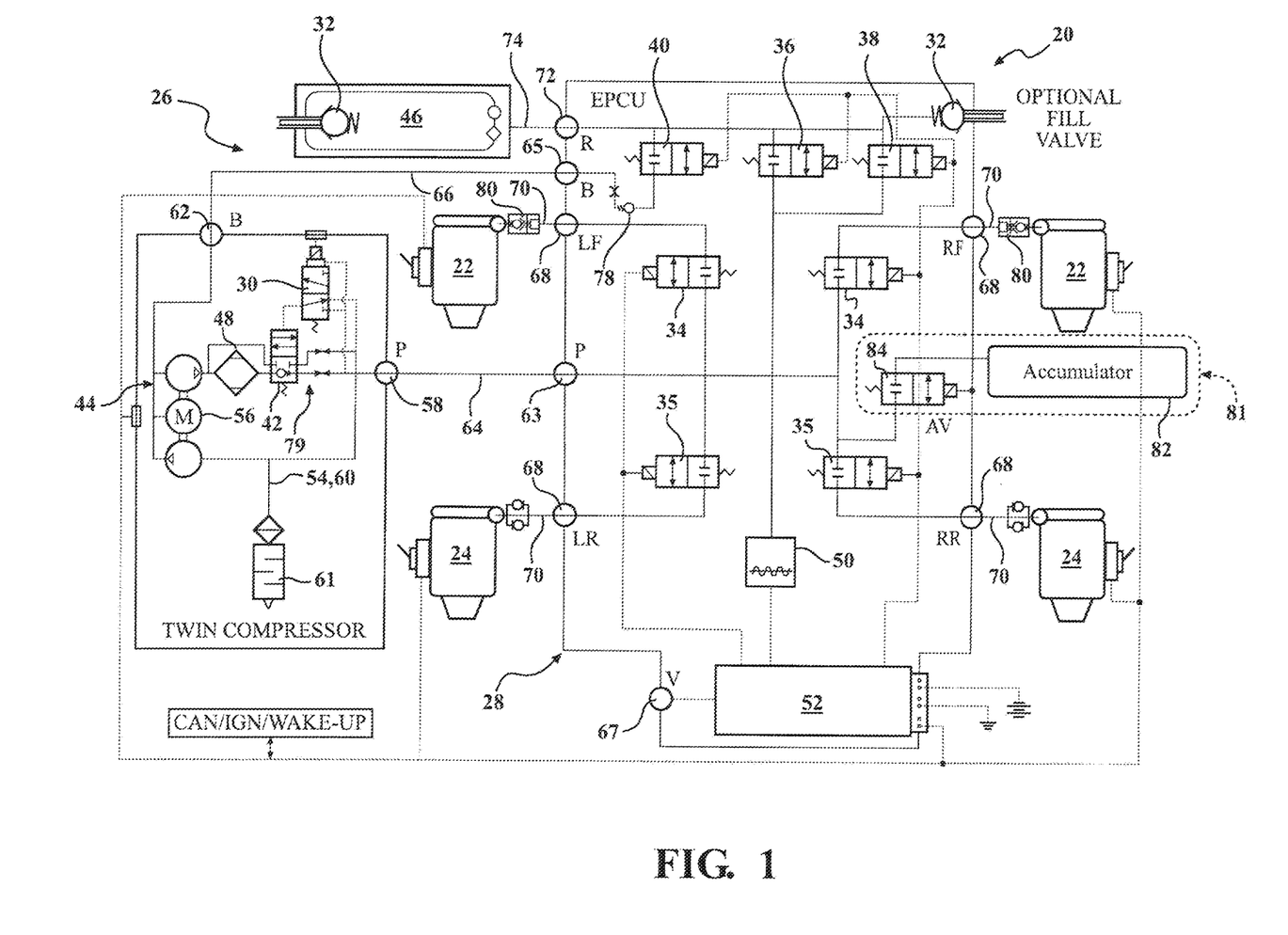
FIG. 1 is a schematic diagram of a first embodiment of an air management system according to aspects of the disclosure.

As best presented in FIG. 1, a first embodiment of the air management system 20 (i.e., for concurrent lowering) connects to a pair of front air springs 22 that interconnect the body and the front wheels of the vehicle, and a pair of rear air springs 24 that interconnect the body and the rear wheels of the vehicle. The air springs 22, 24 dampen relative forces between the body and wheels, and raise and lower the automotive vehicle to a desired height or trim.

The air management system 20 includes a pressurized air source 26 generally connected to the air springs 22, 24 for providing pressurized air for filling the air springs 22, 24, a manifold block 28 coupled to the pressurized air source 26 and including a plurality of valves 32, 34, 35, 36, 38, 40 for controlling which air springs 22, 24 are filled and emptied. More specifically, the pressurized air source 26 includes a compressor 44 for providing pressurized air and a reservoir tank 46 for containing a volume of the pressurized air. It should be appreciated that while the pressurized air source 26 includes both a reservoir tank 46 and compressor 44, the pressurized air source 26 could instead include other components capable of providing the pressurized air and/or include only the compressor 44, for example. The air management system 20 also includes a dryer 48 for reducing the moisture content of the air in the air management system 20 and at least one pressure sensor 50 for determining a pressure in the air management system 20. Furthermore, the air management system 20 includes an electronic control unit 52 disposed in or coupled with the manifold block 28 and is electrically coupled to the valves 30, 34, 35, 36, 38, 40, 42 and compressor 44 for controlling the air management system 20. The electronic control unit 52 can thus operate the compressor 44 and valves 30, 34, 35, 36, 38, 40, 42 to fill or empty the air springs 22, 24. The height varying capabilities of the air management system 20 can be used to perform such functions as maintaining the vehicle ride height due to load variation, lowering the vehicle at speed to provide for improved fuel economy, lowering the vehicle to provide for ease in entering and exiting the vehicle, and for adjusting the height of respective sides of the vehicle for compensating for side-to-side load variations of the vehicle.

The compressor 44 defines an air inlet 54 for receiving air into the compressor 44, as well as a motor 56 for drawing air through the air inlet 54. The compressor 44 also defines a primary outlet 58 for fluidly connecting the compressor 44 with, and providing air to the reservoir tank 46 and air springs 22, 24 through the manifold block 28. Furthermore, the compressor 44 defines an exhaust outlet 60 for exhausting or relieving air from the air management system 20. An exhaust silencer 61 connects to the exhaust outlet 60. A boost inlet port 62 may also be present to enhance performance of the compressor 44. The compressor 44 includes an exhaust valve 30 electrically coupled to and controlled by the electronic control unit 52 for selectively opening and closing the exhaust valve 30 to inhibit or allow air to pass through the exhaust outlet 60. The compressor 44 can also include normally open dryer control valve 42 that can be controlled by the exhaust valve 30; however it should be understood that the normally open dryer control valve 42 is optional. The compressor 44 may also include a series of other control valves that enable functions of the compressor 44, such as pressure, exhaust, and boost.

The manifold block 28 fluidly connects the air springs 22, 24, compressor 44, dryer 48, and reservoir tank 46. The manifold block 28 defines a compressor inlet port 63. A base pneumatic line 64 extends between the primary outlet 58 of the compressor 44 and the compressor inlet port 63 of the manifold block 28 for conveying air between the manifold block 28 and the compressor 44.

The manifold block also 28 defines a boost port 65. A boost line 66 extends between the boost inlet port 62 of the compressor 44 and the boost port 65 of the manifold block 28 for conveying supplemental air between the manifold block 28 and the compressor 44.

The manifold block 28 additionally defines an external vent 67 to vent the electronic control unit 52 if needed. At least one reservoir fill valve 32 is also disposed in the manifold block 28 for filling the reservoir tank 46. Alternatively, the at least one reservoir fill valve 32 may be coupled to the reservoir tank 46 itself (also shown in FIG. 1).

The manifold block 28 further defines four suspension ports 68 that are each fluidly connected to the compressor inlet port 62 inside the manifold block 28. A plurality of suspension pneumatic lines 70 each extend between one of the suspension ports 68 and one of the air springs 22, 24 for conveying air between the manifold block 28 and air springs 22, 24. The manifold block 28 further includes a plurality of front suspension valves 34, each in line with one of the suspension ports 68 inside the manifold block 28 for inhibiting and allowing air to be conveyed between the manifold block 28 and the front air springs 22. Similarly, the manifold block 28 includes a plurality of rear suspension valves 35, each in line with one of the suspension ports 68 inside the manifold block 28 for inhibiting and allowing air to be conveyed between the manifold block 28 and the rear air springs 24. The suspension valves 34, 35 are each electrically coupled with the electronic control unit 52 for selectively opening and closing the suspension valves 34, 35.

To provide high flows on exhaust for a four wheel air suspension system, four suspension valves 34, 35 are utilized—one per each corner of the vehicle. The four suspension valves 34, 35 can be utilized to exhaust or inflate a single axle at any given time in order to lower or raise the vehicle equally from front to rear. It should be understood that the disclosure is not limited to the type, number, and configuration of the suspension valves 34, 35 illustrated in the Figures and discussed herein and could instead utilize any design which isolates the manifold block 28 from the air springs 22, 24.

The reservoir tank 46 stores pressurized air from the compressor 44 for being distributed to the air springs 22, 24. Because of the stored energy of the pressurized air in the reservoir tank 46, the air management system 20 is able to adjust the height of each wheel independently and can elevate the vehicle much quicker than it would be able to without the reservoir tank 46. The manifold block 28 defines a reservoir port 72 that is fluidly connected to the reservoir tank 46. Specifically, a reservoir pneumatic line 74 extends from the reservoir port 72 to the reservoir tank 46 for conveying air between the manifold block 28 and the reservoir tank 46.

The manifold block 28 further includes a first reservoir valve 36 and a second reservoir valve 38 that are each disposed in line with the reservoir port 72 inside the manifold block 28 and electrically coupled to and controlled by the electronic control unit 52 for selectively inhibiting and allowing air to be conveyed between the manifold block 28 and pressurized air source 26 (i.e., reservoir tank 46). Thus, the reservoir valves 36, 38 are in fluid communication with the plurality of suspension valves 34, 35 and the pressurized air source 26. The first reservoir valve 36 and second reservoir valve 38 are positioned in parallel relationship to one another, allowing one or both to be closed at any given time. While the reservoir valves 36, 38 are disclosed in parallel, it should be understood that other arrangements of the reservoir valves 36, 38 may be utilized.

Figure 2:
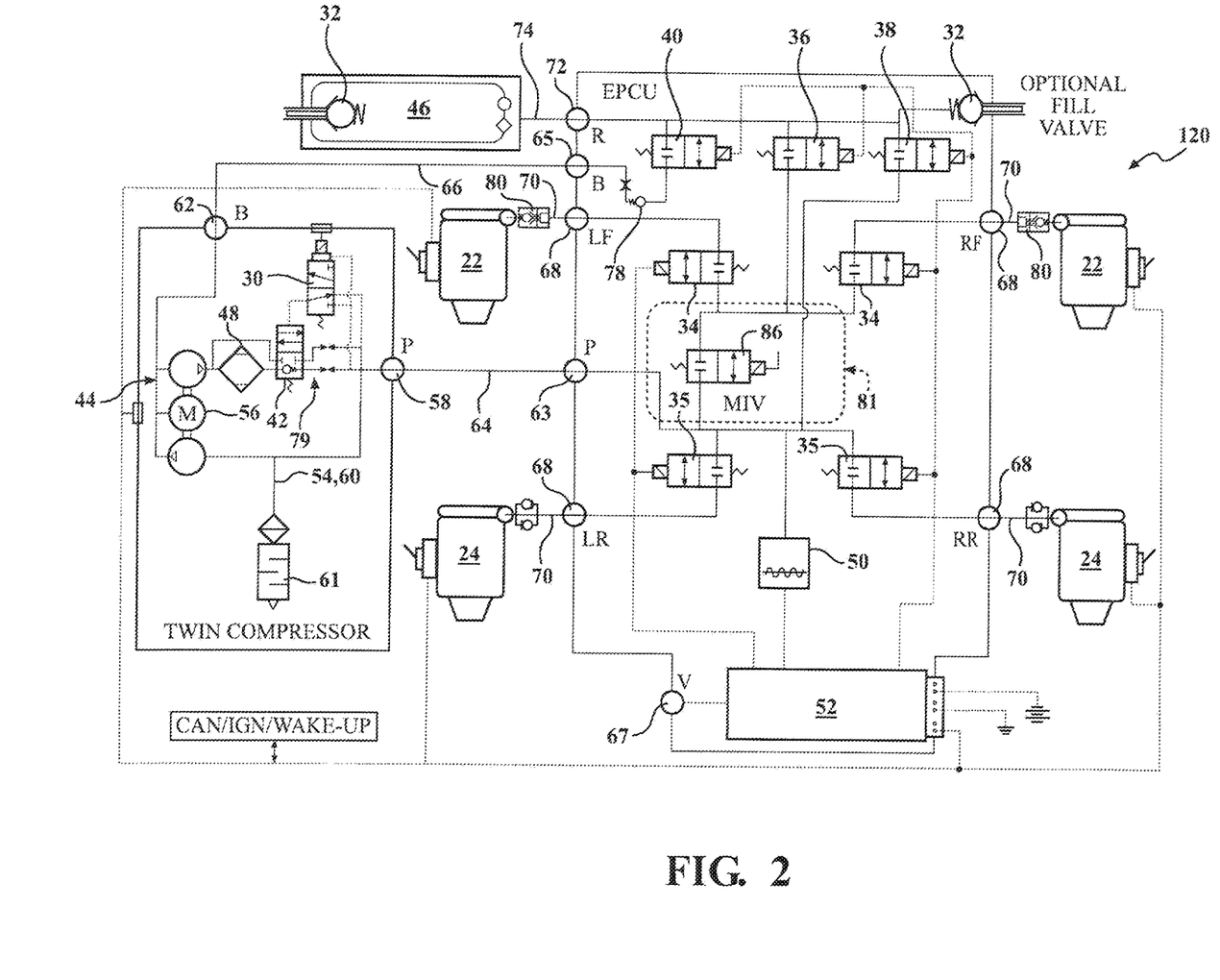
FIG. 2 is a schematic diagram of a second embodiment of the air management system according to aspects of the disclosure.
Figure 3:
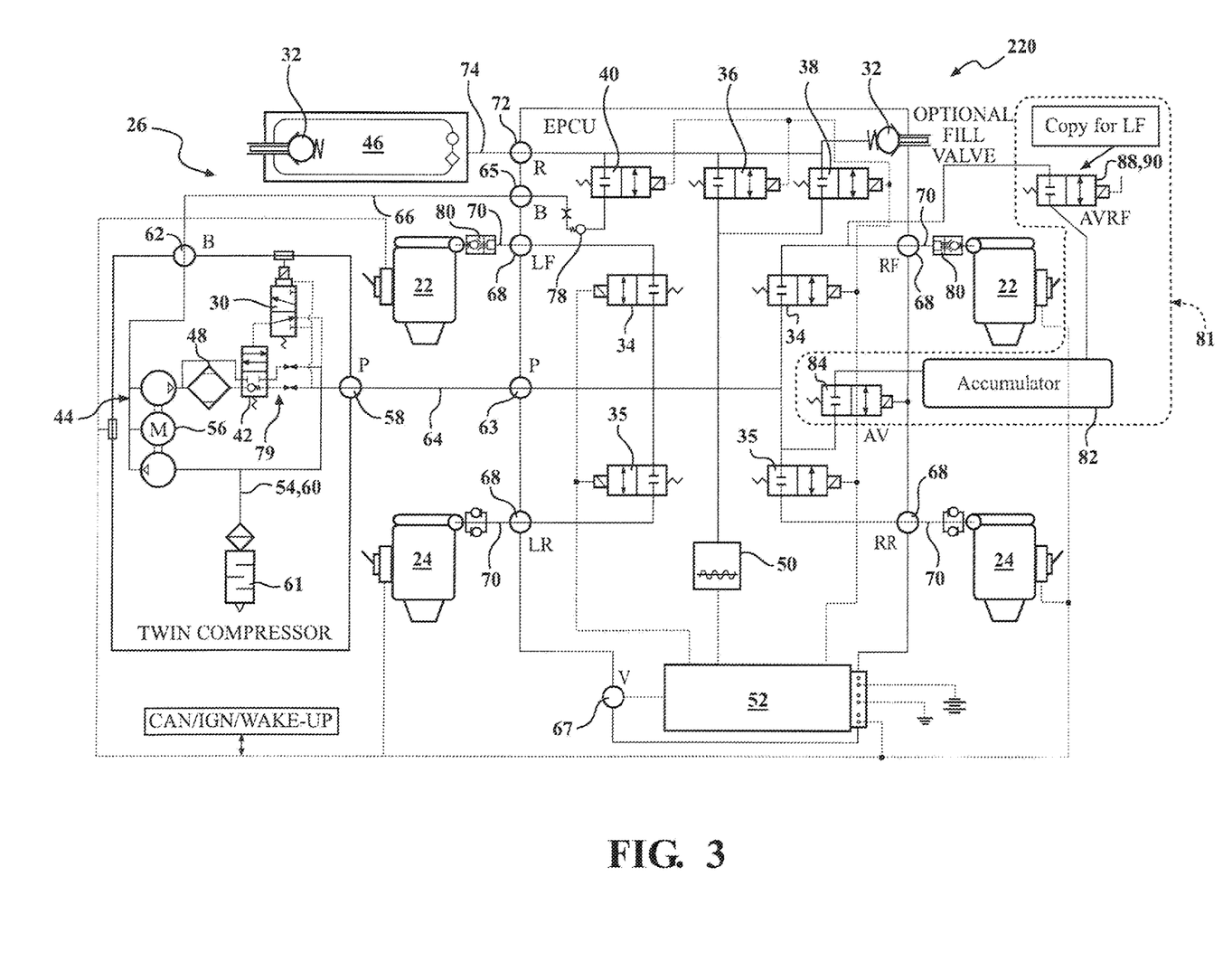
FIG. 3 is a schematic diagram of a third embodiment of the air management system according to aspects of the disclosure.
Figure 4:
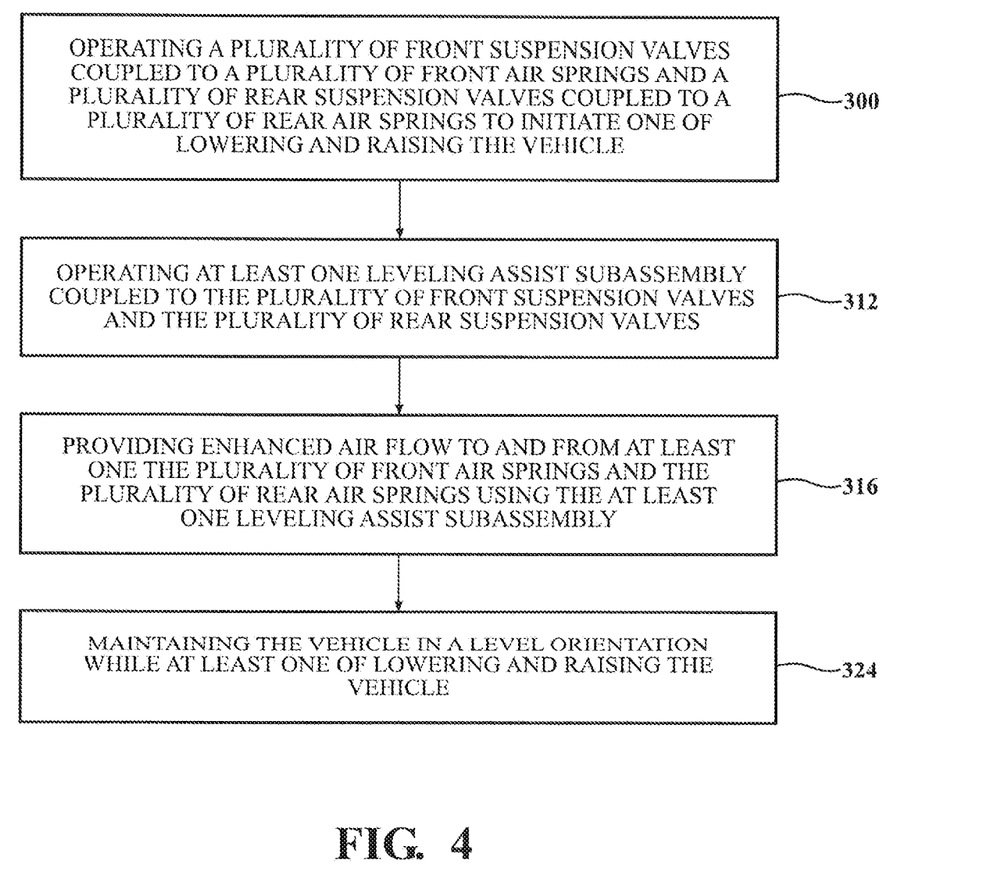
FIG. 4 is a flowchart illustrating steps of a method of operating the air management system during one of lowering and raising a vehicle according to aspects of the disclosure.

Certain types of compressors 44, such as the one shown in FIGS. 1-3, can have nominal air flow increased by introducing additional pressure from an external source. Consequently, the manifold block 28 also includes a boost valve 40 electrically coupled to and controlled by the electronic control unit 52 and the boost line 66 extends between the reservoir tank 46 and boost inlet port 62 of the compressor 44 for selectively directly connecting the reservoir tank 46 and the boost inlet port 62 of the compressor 44. Pressurized air from the reservoir tank 46 can be used to boost the input of the compressor 44 and consequently the air springs 22, 24 may be filled more quickly than when not boosted. The boost valve 40 is electrically coupled to the electronic control unit 52 for selectively opening and closing the boost valve 40. The manifold block 28 additionally includes a boost check valve 78 disposed between the boost valve 40 and a boost port 65 to allow air flow from the reservoir tank 46 through the boost valve 40 to the boost port 65 and prevent air flow from the boost port 65 toward the boost valve 40. This prevents "wet" air from entering the manifold block 28 from the compressor 44 (i.e., air that has not passed through the dryer 48).

The compressor 44 includes the dryer 48 which is coupled to the primary outlet 58 of the compressor 44. It should be understood that while the dryer 48 can be integrated in the compressor 44, it may instead be separate from the compressor 44, for example coupled to the primary outlet 58 of the compressor 44 and to the manifold block 28. The dryer 48 reduces moisture in the air being conveyed through the base pneumatic line 64 to the manifold block 28 before it enters the reservoir tank 46 and air springs 22, 24. Moisture is a common issue for such pressurized systems, as water vapor in the atmosphere can condense out inside the unit and create concerns for corrosion as well as freezing components in cold weather conditions. The dryer 48 typically includes a desiccant disposed therein for absorbing excess moisture in the system that is conveyed through the base pneumatic line 64, for example. The moisture content of the desiccant is increased as air passes through base pneumatic line 64 away from the compressor 44, and the moisture content of the desiccant is decreased as air passes through the dryer 48 and out the exhaust outlet 60 and exhaust silencer 61. Additional control valves in the compressor 44 may be utilized to direct flow.

The pressure sensor 50 is disposed in the manifold block 28 and is electrically coupled to the electronic control unit 52 for measuring the pressure in the manifold block 28, pressurized air source 26 (e.g., reservoir tank 46), and/or air springs 22, 24. In order to obtain individual readings of each of the air springs 22, 24 or the reservoir tank 46, the manifold block 28 may be evacuated and then the valve for the device in question is momentarily opened.

The normally open dryer control valve 42 can be provided in the compressor 44 in-line with the compressor inlet port 62. Alternatively, the dryer control valve 42 could be disposed at the compressor inlet port 62 or elsewhere in the manifold block 28. The dryer control valve 42 can also be electrically coupled to the electronic control unit 52 for selectively opening and closing the dryer control valve 42. In most circumstances, the dryer control valve 42 may be left open to permit air flow back and forth to and from the manifold block 28. However, when an individual pressure reading is required of either the reservoir tank 46 or of any combination of the air springs 22, 24, the dryer control valve 42 can be closed along with the air springs 22, 24 or other air springs 22, 24 and reservoir tank 46, thus isolating the volume of the dryer 48 from the manifold block 28. Since the manifold block 28 consists largely of small drilled holes connecting the components together, with the dryer control valve 42 closed, there is very little air volume exposed to the pressure sensor 50 as opposed to the volume of the manifold block 28, dryer 48, and base pneumatic line 64. This allows the pressure reading of a specific device to stabilize almost instantaneously and with very little air volume loss, thus making them much faster and more efficient. Accordingly, utilization of the dryer control valve 42 can improve the speed and efficiency of taking pressure readings. The air management system 20 may also include additional check valves 80 between the manifold block 28 and the air springs 22, 24 (e.g., connected to the suspension pneumatic lines 70 that are connected to the front air springs 22).

Air management systems, such as air management system 20, may require higher flows on exhaust due to minimum flow rates required by the air dryer 48 as well as for customer requirements, such as maintaining the vehicle in a level orientation during lowering. Specifically, it is desirable to reduce a "horizon" effect (also known as camelling) during lowering of the vehicle by moving both axles (front and rear) together. Such a "horizon" effect may be a result of averaged pressure for each axle (i.e., pressures in the front air springs 22 and pressures in the rear air springs 24) being different and unless the exhaust path (e.g., through exhaust valve 30) is large enough to eliminate pneumatic cross talk between the axles, the axle with the higher pressure backflows into the lower pressure axle and raises it instead of lowering. While the at least one pressure sensor 50 in the manifold block 28 provides a direct feedback to determine if air flow is being generated and that the exhaust function operates, it can be difficult to eliminate pneumatic cross talk without an enlargement of the exhaust path. The pneumatic cross talk depends on the axle weight differences, designs of the air springs 22, 24 and pressures for each axle. Overall system exhaust flow is typically controlled by the size of the air dryer 48 (i.e., orifice of the air dryer 48) and an exhaust throttle 79 as well. However, known designs enlarge the exhaust valve 30 at the expense of the dew point requirements of the dryer 48. To solve this, an enlarged exhaust path (e.g., through exhaust valve 30) requires a redesign of the compressor 44, which may not be easily accomplished.

Thus, the air management system 20 additionally includes at least one leveling assist subassembly 81 to maintain the vehicle in a level orientation while raising and lowering the vehicle. According to an aspect, the at least one leveling assist subassembly 81 includes an accumulator 82 coupled to the manifold block 28 for storing air and an accumulator valve 84 in fluid communication with the plurality of suspension valves 34, 35 and the accumulator 82 to allow exhausted air from the plurality of air springs 22, 24 into the accumulator 82. The electronic control unit 52 is electrically coupled to the accumulator valve 84 for controlling a sequence of operating the accumulator valve 84 and the plurality of suspension valves 34, 35 to provide enhanced exhaust flow from the plurality of air springs 22, 24 to maintain the vehicle in a level orientation while lowering the vehicle.

Consequently, the accumulator 82 and accumulator valve 84 provide an additional exhaust path, but this additional exhaust path does not immediately exhaust air to the atmosphere. Instead, the exhaust air that flows into the accumulator 82 is stored and later exhausted to atmosphere after the lowering event is complete. So, the use of the additional path does not affect the dew point requirement of the dryer 48. The axle rates may still be slightly different depending on the axle weight (i.e. one axle may reach the target height first), but the "horizon" effect will at least be reduced.

It should also be appreciated that the configuration of the air management system 20 disclosed herein provide for fast exhaust rates while meeting the minimum flow requirements of the air dryer 48. As such, this assures that the exhausted air will serve to adequately replenish the desiccant in dryer 48.

As best presented in FIG. 2, a second embodiment of the air management system 120 (i.e., for concurrent raising) is generally shown, where like numerals refer to like parts of the first embodiment. Therefore, only the differences between the first embodiment and the second embodiment are described. The at least one leveling assist subassembly 81 of the second embodiment of the air management system 120 does not include an accumulator 82 or accumulator valve 84.

As with the lowering of the vehicle, it is similarly desirable to reduce any "horizon" effects or camelling when raising the vehicle. So it is important to raise the vehicle by moving both axles (front and rear) together. Nevertheless, axle pressure differences (i.e., pressures in the front air springs 22 compared to pressures in the rear air springs 24) can cause the air to flow into the lower pressure air springs 22, 24 before the high pressure air springs 22, 24. Thus, the at least one leveling assist subassembly 81 of the second embodiment of the air management system 120 additionally includes a manifold isolation valve 86 disposed in the manifold block 28 and coupled between the plurality of front suspension valves 34 and the first reservoir valve 36 and to the compressor inlet port 63 for providing fluid communication for the plurality of front air springs 22 with the reservoir tank 46 (and to the compressor 44). The second reservoir valve 38 is coupled with the plurality of rear suspension valves 35 and the reservoir tank 46 for allowing fluid communication for the plurality of rear air springs 24 with the reservoir tank 46 (the plurality of rear air springs 24 are also coupled to the compressor 44 through the compressor inlet port 63). The electronic control unit 52 is electrically coupled to the manifold isolation valve 86 for controlling a sequence of operating the reservoir valves 36, 38 and the plurality of suspension valves 34, 35 to provide independent inflation air flow to the plurality of front air springs 22 separately from the plurality of rear air springs 24 to maintain the vehicle in a level orientation while raising the vehicle.

The manifold isolation valve 86 effectively splits the manifold block 28 into two portions (front axle and rear axle) and the reservoir valves 36, 38 are ported separately to each axle. With the pneumatic line (e.g., reservoir pneumatic line 74) from the reservoir tank 46 large enough to not restrict the air into the front and rear axles (front and rear air springs 22, 24), each axle will in effect have independent raise capability. Again, the axle rates may be slightly different depending on the axle weight (i.e. one axle may reach the target height first), but the "horizon" effect will be reduced.

As shown in FIG. 3, a third embodiment of the air management system 220 (for concurrent lowering) is generally shown, where like numerals refer to like parts of the first embodiment. Therefore, only the differences between the third embodiment and the first embodiment are described. The at least one leveling assist subassembly 81 of the third embodiment of the air management system 220 includes a pair of corner accumulator blocker valves 88, 90 coupled to the accumulator 82 and manifold block 28 (i.e., to the plurality of front suspension valves 34). Specifically, a first corner accumulator blocker valve 88 is coupled to the accumulator 82 and to one of the plurality of front suspension valves 34 (e.g., the left front suspension valve 34) which is coupled to one of the plurality of front air springs 22 (e.g., the left front air spring 22). Similarly, a second corner accumulator blocker valve 90 is coupled to the accumulator 82 and to another of the plurality of front suspension valves 34 (e.g., the right front suspension valve 34) which is also coupled to another of the plurality of front air springs 22. While both corner accumulator blocker valves 88, 90 are shown coupled to the same accumulator 82, it should be appreciated that more than one accumulator 82 could alternatively be used. The accumulator 82 of the at least one leveling assist subassembly 81 is coupled to the manifold block 28 for storing air. The at least one leveling assist subassembly 81 of the third embodiment of the air management system 220 also includes the accumulator valve 84 in fluid communication with the plurality of suspension valves 34, 35 and the accumulator 82 to allow exhausted air from the plurality of air springs 22, 24 into the accumulator 82. The accumulator valve 84 additionally is used to exhaust air from the accumulator 82 after lowering of the vehicle is complete. The electronic control unit 52 is electrically coupled to the accumulator valve 84 and the pair of corner accumulator blocker valves 88, 90 for controlling a sequence of operating the accumulator valve 84 and the pair of corner accumulator blocker valves 88, 90 and the plurality of suspension valves 34, 35 to provide enhanced exhaust flow from the plurality of air springs 22, 24 to maintain the vehicle in a level orientation while lowering the vehicle.

While the air management systems 20, 120, 220 are shown as separate embodiments, it should be understood that the features of each of these air management systems 20, 120, 220 could be integrated into a single system. Specifically, the air management systems 20, 220 could additionally include the manifold isolation valve 86 coupled between the plurality of front suspension valves 34 and the first reservoir valve 36 for providing fluid communication for the plurality of front air springs 22 with the reservoir tank 46, for example. And the second reservoir valve 38 of the air management system 20 could be separately coupled with the plurality of rear suspension valves 35 and the reservoir tank 46 for allowing fluid communication for the plurality of rear air springs 24 with the reservoir tank 46. Alternatively, the air management system 120 could additionally include one or more corner accumulator block valves 88, 90, an accumulator 82 coupled to the manifold block 28 for storing air, and an accumulator valve 84 in fluid communication with the plurality of suspension valves 34, 35 and the accumulator 82 to allow exhausted air from the plurality of air springs 22, 24 into the accumulator 82.

Figure 5:
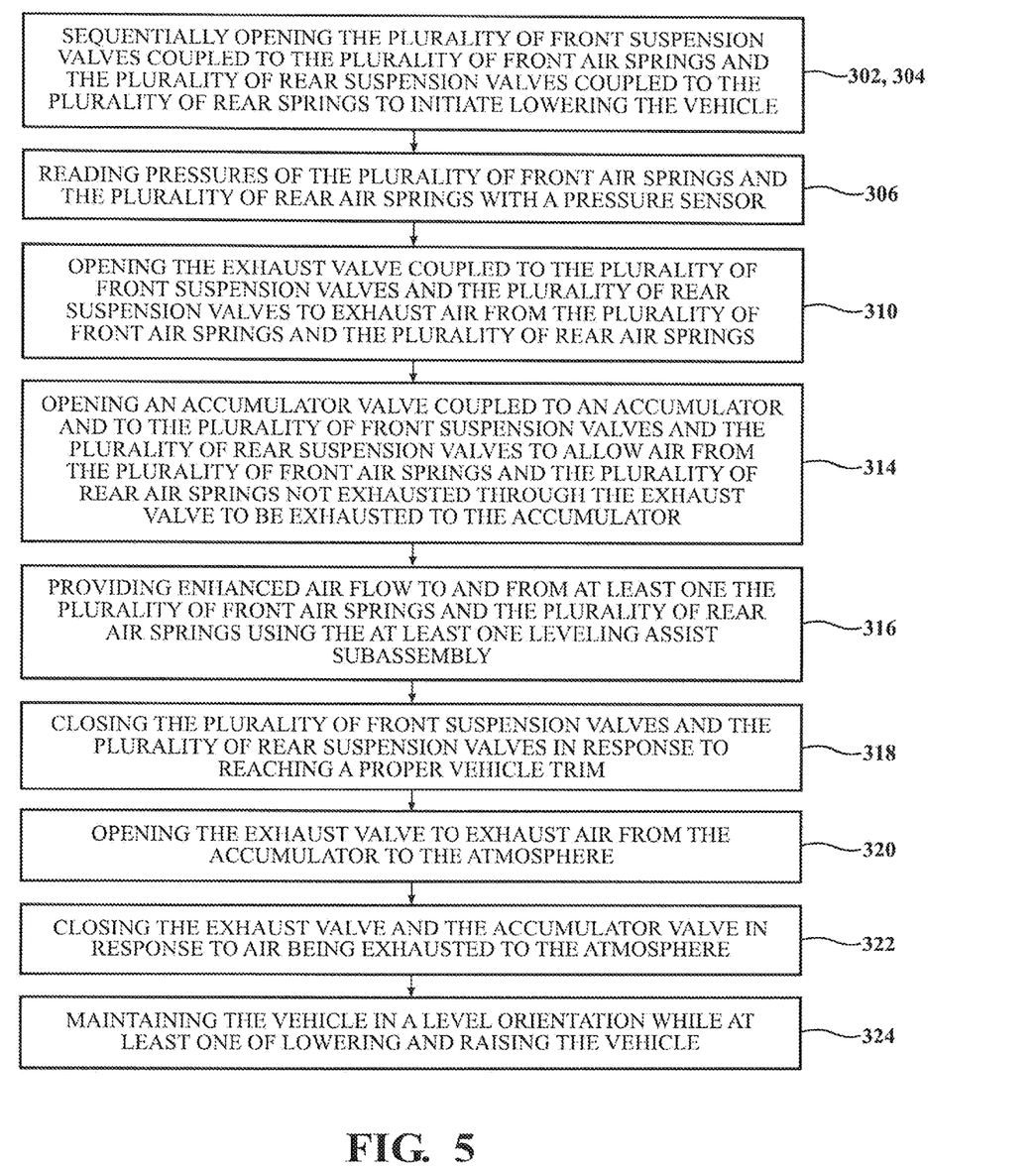
FIG. 5 is a flowchart illustrating steps of a method of operating the first embodiment of the air management system during lowering of the vehicle according to aspects of the disclosure.

As best shown in FIGS. 4-7, a method of operating an air management system 20, 120, 220 during one of lowering and raising a vehicle is provided. The method includes the step of 300 operating a plurality of front suspension valves 34 coupled to a plurality of front air springs 22 and a plurality of rear suspension valves 35 coupled to a plurality of rear air springs 24 to initiate one of lowering and raising the vehicle. Specifically, as shown in FIG. 5, with the first embodiment of the air management system 20, the step 300 can include the step of 302 opening the plurality of front suspension valves 34 coupled to the plurality of front air springs 22 and the plurality of rear suspension valves 35 coupled to the plurality of rear air springs 24 to initiate lowering the vehicle. The plurality of suspension valves 34, 35 can be opened sequentially to read the spring pressures (using the at least one pressure sensor 50 in the manifold block 28) and/or to reduce peak valve current prior to opening the accumulator valve 84. Thus, the step of 302 opening the plurality of front suspension valves 34 coupled to the plurality of front air springs 22 and the plurality of rear suspension valves 35 coupled to the plurality of rear air springs 24 to initiate lowering the vehicle can include 304 sequentially opening the plurality of front suspension valves 34 coupled to the plurality of front air springs 22 and the plurality of rear suspension valves 35 coupled to the plurality of rear air springs 24 to initiate lowering the vehicle. Next, 306 reading pressures of the plurality of front air springs 22 and the plurality of rear air springs 24 with a pressure sensor 50 prior to opening the exhaust valve 30. The pressure reading can determine the mode to lower or raise the vehicle. The method can also include the step of 310 opening the exhaust valve 30 coupled to the plurality of front suspension valves 34 and the plurality of rear suspension valves 35 to exhaust air from the plurality of front air springs 22 and the plurality of rear air springs 24. The method can proceed with the step of 312 operating at least one leveling assist subassembly 81 coupled to the plurality of front suspension valves 34 and the plurality of rear suspension valves 35.

In more detail, the step of 312 can include the step of 314 opening an accumulator valve 84 coupled to an accumulator 82 and to the plurality of front suspension valves 34 and the plurality of rear suspension valves 35 to allow air from the plurality of front air springs 22 and the plurality of rear air springs 24 not exhausted through the exhaust valve 30 to be exhausted to the accumulator 82. The method includes the step of 316 providing enhanced air flow to and from at least one the plurality of front air springs 22 and the plurality of rear air springs 24 using the at least one leveling assist subassembly 81. The method also can include the step of 318 closing the plurality of front suspension valves 34 and the plurality of rear suspension valves 35 in response to reaching a proper vehicle trim. The method can continue with the steps of 320 opening the exhaust valve 30 to exhaust air from the accumulator 82 to the atmosphere and 322 closing the exhaust valve 30 and the accumulator valve 84 in response to air being exhausted to the atmosphere. Then, the method includes the step of 324 maintaining the vehicle in a level orientation while at least one of lowering and raising the vehicle.

Figure 6:
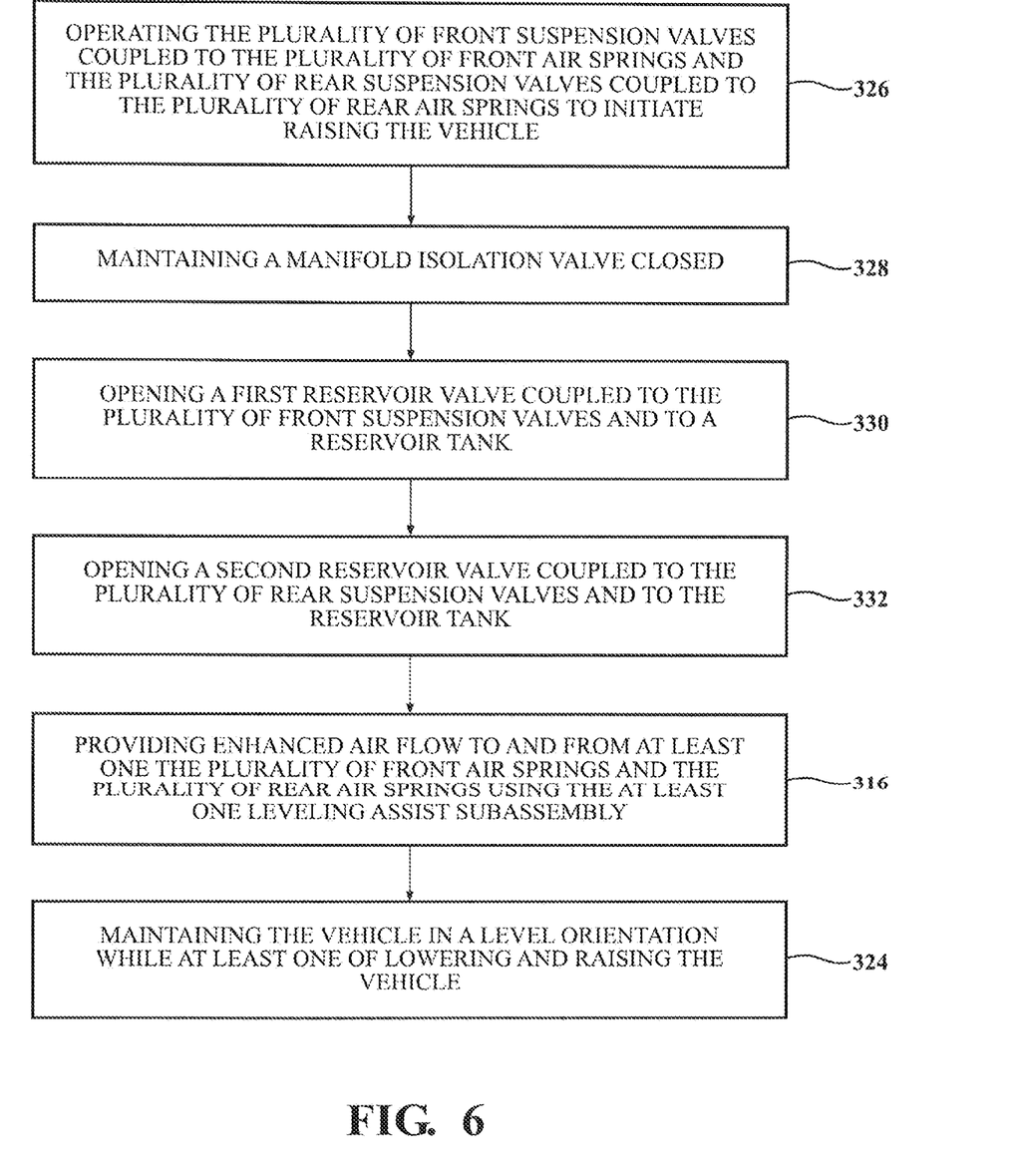
FIG. 6 is a flowchart illustrating steps of a method of operating the second embodiment of the air management system during raising of the vehicle according to aspects of the disclosure.

Referring to FIG. 6, with the second embodiment of the air management system 120, the step of 300 operating a plurality of front suspension valves 34 coupled to a plurality of front air springs 22 and a plurality of rear suspension valves 35 coupled to a plurality of rear air springs 24 to initiate one of lowering and raising the vehicle can include 326 opening the plurality of front suspension valves 34 coupled to the plurality of front air springs 22 and the plurality of rear suspension valves 35 coupled to the plurality of rear air springs 24 to initiate raising the vehicle. The step of 312 operating at least one leveling assist subassembly 81 coupled to the plurality of front suspension valves 34 and the plurality of rear suspension valves 35 can include the steps of 328 maintaining a manifold isolation valve 86 closed. The method can also include the steps of 330 opening a first reservoir valve 36 coupled to the plurality of front suspension valves 34 and to a reservoir tank 46 and 332 opening a second reservoir valve 38 coupled to the plurality of rear suspension valves 35 and to the reservoir tank 46. Again, the plurality of suspension valves 34, 35 can be opened sequentially to reduce peak valve current prior to opening the reservoir valves 36, 38. Additionally, a pressure reading can be completed after opening the manifold isolation valve 86 to allow the front axle pressures access to the at least one pressure sensor 50 in the manifold block 28. As with the method utilizing the first embodiment of the air management system 20, the method includes the steps of 322 providing enhanced air flow to and from at least one the plurality of front air springs 22 and the plurality of rear air springs 24 using the at least one leveling assist subassembly 81 and 324 maintaining the vehicle in a level orientation while at least one of lowering and raising the vehicle.

Figure 7:
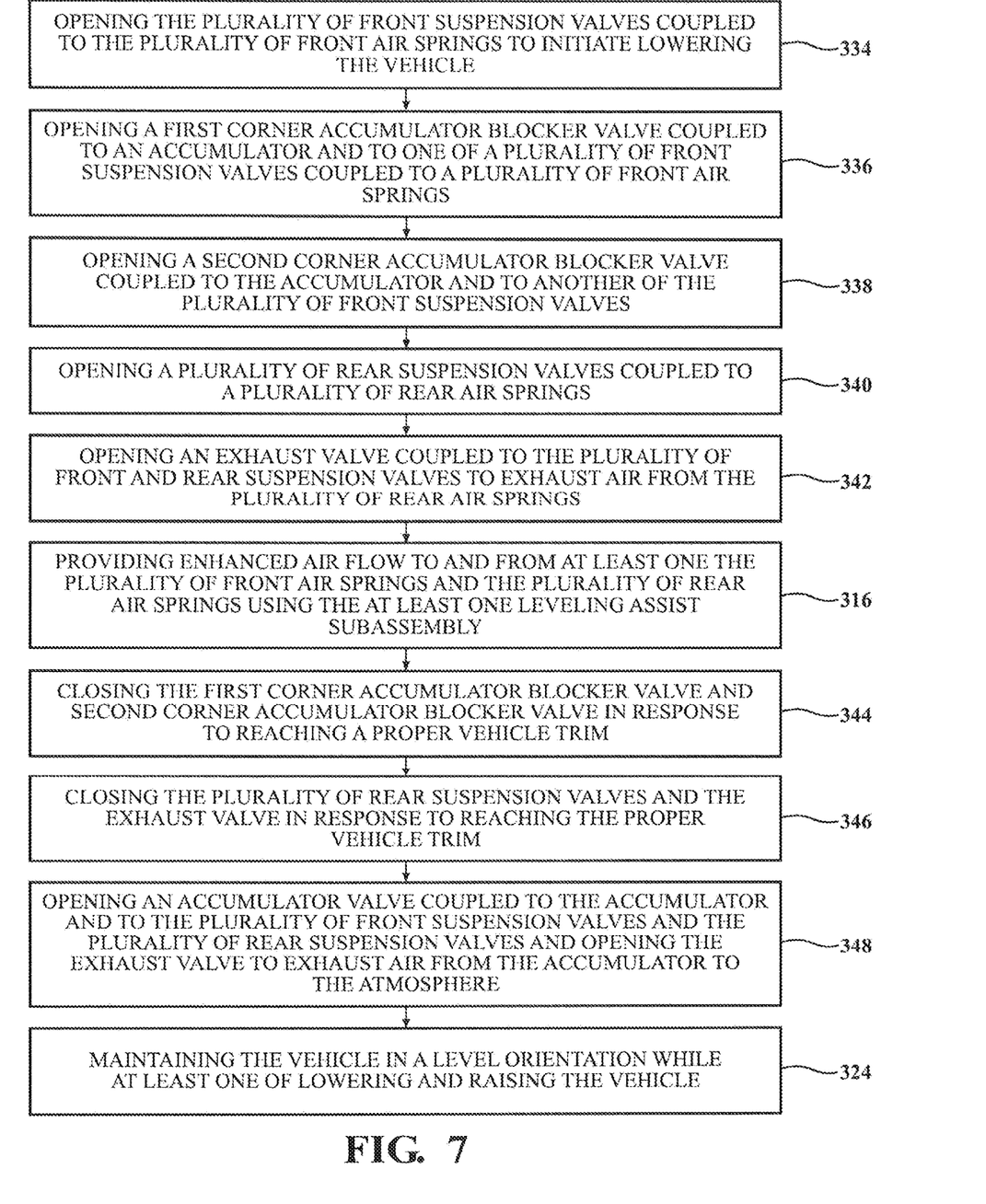
FIG. 7 is a flowchart illustrating steps of a method of operating the third embodiment of the air management system during lowering of the vehicle according to aspects of the disclosure.

A method of operating the air management system 220 during lowering is additionally provided, as best shown in FIG. 7 (i.e., using the third embodiment of the air management system 220 to lower the vehicle). The step of 300 operating a plurality of front suspension valves 34 coupled to a plurality of front air springs 22 and a plurality of rear suspension valves 35 coupled to a plurality of rear air springs 24 to initiate one of lowering and raising the vehicle can include the step of 334 opening the plurality of front suspension valves 34 coupled to the plurality of front air springs 22 to initiate lowering the vehicle. The step of 312 operating at least one leveling assist subassembly 81 coupled to the plurality of front suspension valves 34 and the plurality of rear suspension valves 35 can include the steps of 336 opening a first corner accumulator blocker valve 88 coupled to an accumulator 82 and to one of a plurality of front suspension valves 34 coupled to a plurality of front air springs 22. The method proceeds by 338 opening a second corner accumulator blocker valve 90 coupled to the accumulator 82 and to another of the plurality of front suspension valves 34. Next, 340 opening a plurality of rear suspension valves 35 coupled to a plurality of rear air springs 24. The method then includes the step of 342 opening an exhaust valve 30 coupled to the plurality of front and rear suspension valves 34, 35 to exhaust air from the plurality of rear air springs 24. The method continues by 316 providing enhanced air flow to and from at least one the plurality of front air springs 22 and the plurality of rear air springs 24 using the at least one leveling assist subassembly 81. The next step of the method is 344 closing the first corner accumulator blocker valve 88 and second corner accumulator blocker valve 90 in response to reaching a proper vehicle trim (i.e., for the front of the vehicle). The method also includes the step of 346 closing the plurality of rear suspension valves 35 and the exhaust valve 30 in response to reaching the proper vehicle trim (i.e., for the rear of the vehicle). The method additionally includes the step of 348 opening an accumulator valve 84 coupled to the accumulator 82 and to the plurality of front suspension valves 34 and the plurality of rear suspension valves 35 and opening the exhaust valve 30 to exhaust air from the accumulator 82 to the atmosphere. Once again, the method includes the step of 324 maintaining the vehicle in a level orientation while at least one of lowering and raising the vehicle.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. An air management system for controlling an air suspension assembly of an automotive vehicle comprising:
    a pressurized air source;
    a manifold block coupled to said pressurized air source and including a plurality of front suspension valves and a plurality of rear suspension valves in fluid communication with said pressurized air source for controlling air flow to and from a plurality of front air springs and a plurality of rear air springs;
    at least one leveling assist subassembly in fluid communication with said plurality of front suspension valves and said plurality of rear suspension valves to allow air flow to and from the plurality of front air springs and the plurality of rear air springs; and
    an electronic control unit electrically coupled to said plurality of front suspension valves and said plurality of rear suspension valves and said at least one leveling assist subassembly for controlling a sequence of operating said at least one leveling assist subassembly and said plurality of front suspension valves and said plurality of rear suspension valves to enhance the air flow from the plurality of front air springs and the plurality of rear air springs to maintain the vehicle in a level orientation while at least one of lowering and raising the vehicle,
    wherein said pressurized air source includes a compressor and a reservoir tank coupled to said manifold block and said manifold block further includes a first reservoir valve in fluid communication with said plurality of front suspension valves and said reservoir tank,
    wherein said at least one leveling assist subassembly includes a manifold isolation valve coupled between said plurality of front suspension valves and said first reservoir valve for providing fluid communication from the plurality of front air springs with said reservoir tank and said manifold isolation valve is electrically coupled to said electronic control unit to provide independent inflation air flow to the plurality of front air springs separately from the plurality of rear air springs to maintain the vehicle in a level orientation while raising the vehicle.

2. The air management system as set forth in claim 1, wherein said manifold block includes a second reservoir valve coupled with said plurality of rear suspension valves and said reservoir tank for allowing fluid communication from the plurality of rear air springs with said reservoir tank.

3. The air management system as set forth in claim 1, further including at least one reservoir fill valve disposed in said manifold block for filling said reservoir tank.

4. The air management system as set forth in claim 1, wherein said compressor defines an exhaust outlet for exhausting air from said air management system and includes an exhaust valve electrically coupled to said electronic control unit and controlled by said electronic control unit to selectively open and close to inhibit and allow air to pass through said exhaust outlet.

5. The air management system as set forth in claim 1, wherein said compressor includes an air dryer for reducing moisture in air being conveyed through said air management system.

6. The air management system as set forth in claim 1, wherein said at least one leveling assist subassembly includes an accumulator coupled to said manifold block for storing air and an accumulator valve electrically coupled to said electronic control unit and disposed in said manifold block and in fluid communication with said plurality of suspension valves to allow exhausted air from the plurality of front air springs and the plurality of rear air springs into said accumulator to provide enhanced exhaust flow from the plurality of front air springs and the plurality of rear air springs to maintain the vehicle in a level orientation while lowering the vehicle.

7. The air management system as set forth in claim 1, wherein said at least one leveling assist subassembly includes an accumulator coupled to said manifold block for storing air and an accumulator valve electrically coupled to said electronic control unit and disposed in said manifold block and in fluid communication with said plurality of suspension valves and a pair of corner accumulator blocker valves each coupled to said accumulator and to said plurality of front suspension valves and to said electronic control unit to allow exhausted air from the plurality of front air springs and the plurality of rear air springs into said accumulator to provide enhanced exhaust flow from the plurality of front air springs and the plurality of rear air springs to maintain the vehicle in a level orientation while lowering the vehicle.

8. The air management system as set forth in claim 1, further including a pressure sensor disposed in the manifold block and electrically coupled to said electronic control unit for measuring pressure in at least one of said manifold block and said pressurized air source and the plurality of front air springs and the plurality of rear air springs.

9. A method of operating an air management system during one of lowering and raising a vehicle, comprising the steps of:
    operating a plurality of front suspension valves coupled to a plurality of front air springs and a plurality of rear suspension valves coupled to a plurality of rear air springs to initiate one of lowering and raising the vehicle;
    operating at least one leveling assist subassembly coupled to the plurality of front suspension valves and the plurality of rear suspension valves;
    providing enhanced air flow to and from at least one of the plurality of front air springs and the plurality of rear air springs using the at least one leveling assist subassembly; and
    maintaining the vehicle in a level orientation while at least one of lowering and raising the vehicle,
    wherein the step of operating the plurality of front suspension valves coupled to the plurality of front air springs and the plurality of rear suspension valves coupled to the plurality of rear air springs to initiate one of lowering and raising the vehicle includes opening the plurality of front suspension valves coupled to the plurality of front air springs and the plurality of rear suspension valves coupled to the plurality of rear air springs to initiate lowering the vehicle, wherein the method further includes the step of opening an exhaust valve coupled to the plurality of front suspension valves and the plurality of rear suspension valves to exhaust air from the plurality of front air springs and the plurality of rear air springs and wherein the step of operating at least one leveling assist subassembly coupled to the plurality of front suspension valves and the plurality of rear suspension valves includes opening an accumulator valve coupled to an accumulator and to the plurality of front suspension valves and the plurality of rear suspension valves to allow air from the plurality of front air springs and the plurality of rear air springs not exhausted through the exhaust valve to be exhausted to the accumulator.

10. The method as set forth in claim 9, wherein the step of opening the plurality of front suspension valves coupled to the plurality of front air springs and the plurality of rear suspension valves coupled to the plurality of rear air springs to initiate lowering the vehicle includes:
   sequentially opening the plurality of front suspension valves coupled to the plurality of front air springs and the plurality of rear suspension valves coupled to the plurality of rear air springs; and
   reading pressures of the plurality of front air springs and the plurality of rear air springs with a pressure sensor.

11. The method as set forth in claim 9, further including the steps of:
   closing the plurality of front suspension valves and the plurality of rear suspension valves in response to reaching a proper vehicle trim;
   opening the exhaust valve to exhaust air from the accumulator to the atmosphere; and
   closing the exhaust valve and the accumulator valve in response to air being exhausted to the atmosphere.

12. The method as set forth in claim 9, wherein the step of operating the plurality of front suspension valves coupled to the plurality of front air springs and the plurality of rear suspension valves coupled to the plurality of rear air springs to initiate one of lowering and raising the vehicle includes opening the plurality of front suspension valves coupled to the plurality of front air springs and the plurality of rear suspension valves coupled to the plurality of rear air springs to initiate raising the vehicle.

13. The method as set forth in claim 12, further including the steps of:
   maintaining a manifold isolation valve closed; and
   opening a first reservoir valve coupled to the plurality of front suspension valves and to a reservoir tank; and
   opening a second reservoir valve coupled to the plurality of rear suspension valves and to the reservoir tank.

14. The method as set forth in claim 9, wherein the step of operating a plurality of front suspension valves coupled to a plurality of front air springs and a plurality of rear suspension valves coupled to a plurality of rear air springs to initiate one of lowering and raising the vehicle can include the step of opening the plurality of front suspension valves coupled to the plurality of front air springs to initiate lowering the vehicle and wherein the step of operating the at least one leveling assist subassembly coupled to the plurality of front suspension valves and the plurality of rear suspension valves includes the steps of:
   opening a first corner accumulator blocker valve coupled to an accumulator and to one of a plurality of front suspension valves coupled to a plurality of front air springs;
   opening a second corner accumulator blocker valve coupled to the accumulator and to another of the plurality of front suspension valves; and
   closing the first corner accumulator blocker valve and the second corner accumulator blocker valve in response to reaching a proper vehicle trim.

15. The method as set forth in claim 14, further including the steps of:
   opening a plurality of rear suspension valves coupled to a plurality of rear air springs;
   opening an exhaust valve coupled to the plurality of front suspension valves and the plurality of rear suspension valves to exhaust air from the plurality of rear air springs;
   closing the plurality of rear suspension valves and the exhaust valve in response to reaching the proper vehicle trim; and wherein the step of operating the at least one leveling assist subassembly coupled to the plurality of front suspension valves and the plurality of rear suspension valves includes opening an accumulator valve coupled to the accumulator and to the plurality of front suspension valves and the plurality of rear suspension valves.

16. The method as set forth in claim 15, further including the step of opening the exhaust valve to exhaust air from the accumulator to the atmosphere.

17. An air management system for controlling an air suspension assembly of an automotive vehicle comprising:
   a pressurized air source;
   a manifold block coupled to said pressurized air source and including a plurality of front suspension valves and a plurality of rear suspension valves in fluid communication with said pressurized air source for controlling air flow to and from a plurality of front air springs and a plurality of rear air springs;
   at least one leveling assist subassembly in fluid communication with said plurality of front suspension valves and said plurality of rear suspension valves to allow air flow to and from the plurality of front air springs and the plurality of rear air springs; and
   an electronic control unit electrically coupled to said plurality of front suspension valves and said plurality of rear suspension valves and said at least one leveling assist subassembly for controlling a sequence of operating said at least one leveling assist subassembly and said plurality of front suspension valves and said plurality of rear suspension valves to enhance the air flow from the plurality of front air springs and the plurality of rear air springs to maintain the vehicle in a level orientation while at least one of lowering and raising the vehicle,
   wherein said pressurized air source includes a compressor and a reservoir tank coupled to said manifold block and said manifold block further includes a first reservoir valve in fluid communication with said plurality of front suspension valves and said reservoir tank,
   wherein the air management system further includes at least one reservoir fill valve disposed in said manifold block for filling said reservoir tank.

18. The air management system as set forth in claim 17, wherein said compressor defines an exhaust outlet for exhausting air from said air management system and includes an exhaust valve electrically coupled to said electronic control unit and controlled by said electronic control unit to selectively open and close to inhibit and allow air to pass through said exhaust outlet.

19. The air management system as set forth in claim 17, wherein said at least one leveling assist subassembly includes an accumulator coupled to said manifold block for storing air and an accumulator valve electrically coupled to said electronic control unit and disposed in said manifold block and in fluid communication with said plurality of suspension valves to allow exhausted air from the plurality of front air springs and the plurality of rear air springs into said accumulator to provide enhanced exhaust flow from the plurality of front air springs and the plurality of rear air springs to maintain the vehicle in a level orientation while lowering the vehicle.

20. The air management system as set forth in claim 17, wherein said at least one leveling assist subassembly includes an accumulator coupled to said manifold block for storing air and an accumulator valve electrically coupled to said electronic control unit and disposed in said manifold block and in fluid communication with said plurality of suspension valves and a pair of corner accumulator blocker valves each coupled to said accumulator and to said plurality of front suspension valves and to said electronic control unit to allow exhausted air from the plurality of front air springs and the plurality of rear air springs into said accumulator to provide enhanced exhaust flow from the plurality of front air springs and the plurality of rear air springs to maintain the vehicle in a level orientation while lowering the vehicle.

* * * * *